United States Patent [19]
Dixon

[11] Patent Number: 6,064,177
[45] Date of Patent: May 16, 2000

[54] TWO-PART BATTERY CHARGER/POWER CABLE ARTICLE WITH MULTIPLE DEVICE CAPABILITY

[76] Inventor: Steven C. Dixon, 2857 Via Del Allazon, Bonita, Calif. 91902

[21] Appl. No.: 09/225,984

[22] Filed: Jan. 5, 1999

[51] Int. Cl.[7] ........................................................ H02J 7/02
[52] U.S. Cl. ............................................ 320/111; 320/107
[58] Field of Search .................................... 320/107, 111, 320/112, 114; 439/121, 170, 171, 172, 173, 174, 175, 221; D13/107, 108; 455/575, 90

[56] References Cited

U.S. PATENT DOCUMENTS

| | | |
|---|---|---|
| 4,829,224 | 5/1989 | Gandelman et al. . |
| 5,007,863 | 4/1991 | Xuan . |
| 5,127,844 | 7/1992 | Léman et al. . |
| 5,170,067 | 12/1992 | Baum et al. . |
| 5,326,283 | 7/1994 | Chen . |
| 5,510,691 | 4/1996 | Palatov . |
| 5,648,712 | 7/1997 | Hahn ........................................ 320/111 |
| 5,714,805 | 2/1998 | Logaugh . |
| 5,733,674 | 3/1998 | Law et al. ..................................... 429/9 |
| 5,847,541 | 12/1998 | Hahn ........................................ 320/111 |

*Primary Examiner*—Adolf Deneke Berhane
*Assistant Examiner*—Gregory J. Toatley, Jr.
*Attorney, Agent, or Firm*—Brown Martin Haller & McClain, LLP

[57] ABSTRACT

An article is disclosed which provides for powering or charging the battery of a variety of different electronic devices, with the article being in two parts. The first part has components such that it is "universal" for use with all of the variety of different devices, and the second part has components which are specific to the operation of only a single model, type or brand of such device or of closely related devices which operate with the same voltage and plug-compatibility requirements of the specific device. In particular, the article with both parts (modules) present will operate a specific model, type or brand of device. However one can disconnect the two parts from each other and connect a different second part for a different device to the same first part, thereby being able to operate two different devices with substitution of only one part (the second) rather than requiring substitution of the entire article when a difference device must be powered or its battery charged. The article is particularly useful for powering or charging the batteries of devices such as cellular telephones, computers and the like from house, office or other building electrical systems or from vehicle electrical systems.

11 Claims, 3 Drawing Sheets

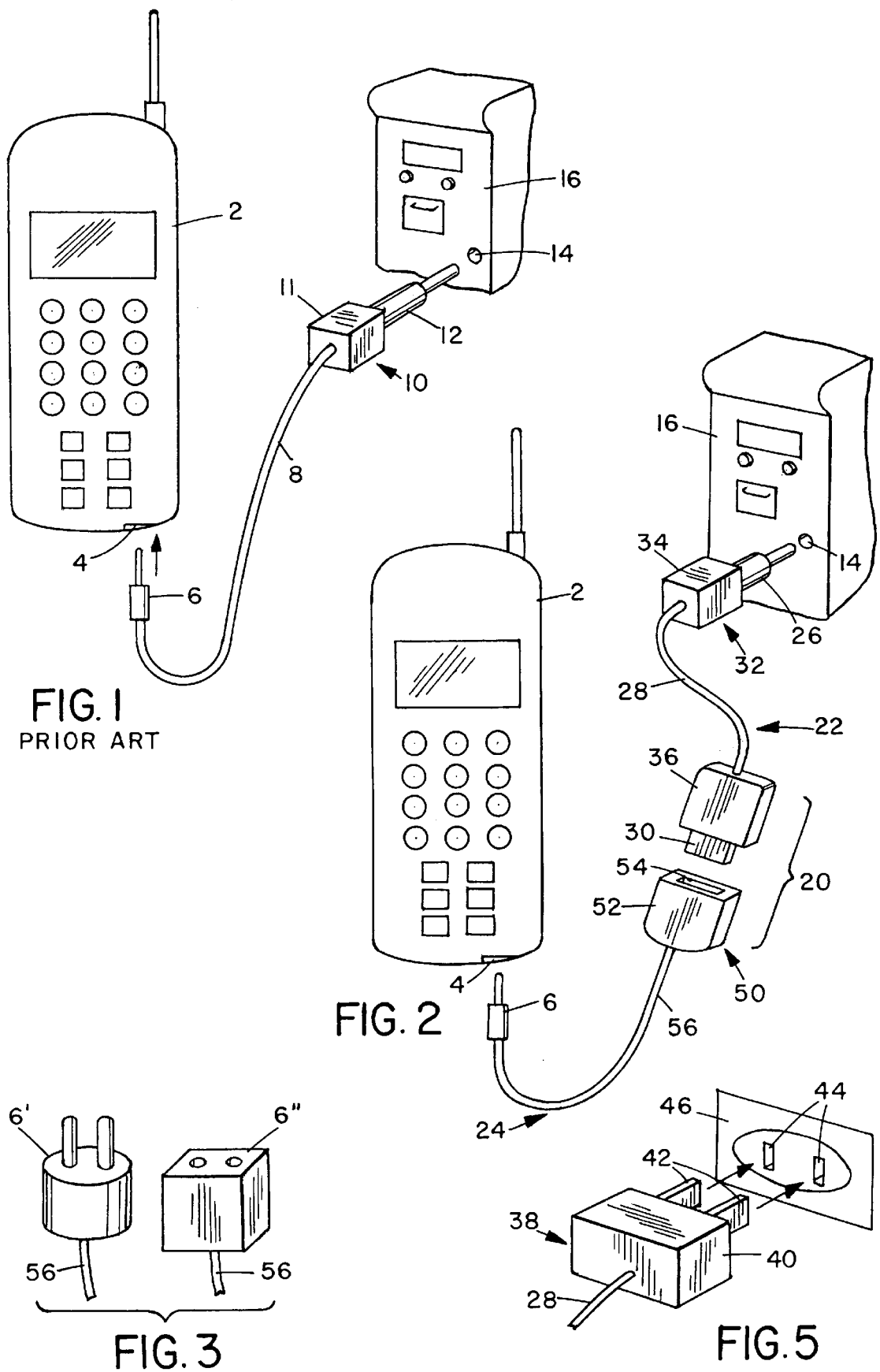

TWO-PART BATTERY CHARGER/POWER CABLE ARTICLE WITH MULTIPLE DEVICE CAPABILITY

BACKGROUND OF THE INVENTION

1. Field of the Invention

The invention herein relates to articles for powering or charging the battery of electronic devices such as cellular telephones, computers and the like from low voltage power sources such as automobile electrical systems or low voltage takeoffs from household electrical wiring.

2. Description of the Prior Art

Numerous electronic devices run on low voltage electrical power, usually battery power. Laptop and palmtop computers, cellular telephones, calculators, compact disk players, radios, and other low voltage devices are all widely known and used. To supplement the battery power in such a device, and to recharge the battery either continually or periodically, one connects the device to a source of electrical power. In many cases the source itself is a low voltage system, such as a vehicle's electrical system, powered from the vehicle's battery and alternator. In other cases the source is a normal household or office 110-volt AC system, which is reduced by an intermediate converter to the low voltage DC used by the device. It is common for manufacturers of such devices to include pre-wired connectors for low voltage connections (usually vehicle connections), or pre-wired converters for household or office electrical system connections, or both, packaged with such devices for sale to the customers/users. Such converters are unitary devices which include a line plug or plug prongs to plug into the 110-volt AC source, e.g, a house or office circuit through a wall socket , the input side of the converter connected to the line plug or prongs directly or through a short length of 2- or 3-wire conductor, and a second 2- or 3-wire conductor connected to the output side of the converter to transmit the low voltage DC power to the device, the second conductor terminating in a second "device-specific" plug configured to be received in a socket built into the device and connecting with the device's internal operating and battery charging circuitry. Similarly, the low voltage connectors are also unitary devices which include a line plug to plug into the 12-volt DC source, e.g, a car's electrical system through the cigarette lighter socket, a second (device-specific) plug configured to be received in a socket built into the device and connecting with the device's internal operating and battery charging circuitry, and a length of 2- or 3-wire conductor to conduct the source power to the device. Since most electronic devices do not operate on 12-volt power, the low voltage connector includes an intermediate resistance circuit to reduce the 12-volt source power to the specific low voltage (<12 V) required by the device. Commonly the resistance circuit and the line plug are constructed as a single unit, with the wire conductor then joining that unit with the second plug.

A typical prior art system of this type is illustrated in FIG. 1. An electronic device, here exemplified by a cellular telephone 2, has a receiving socket 4 for receiving a device-specific plug 6 which is at one end of a 2- or 3-wire conductor 8. At the other end of the conductor 8 is a conventional resistance circuit 10 (inside housing 11), the resistance circuit 10 being connected within housing 11 to a line plug 12, which is configured to connect to a car's electrical system, typically by plugging into the cigarette lighter socket 14 mounted in the car's dashboard 16.

Variations are common. The resistance circuit and its housing 10 can be at an intermediate position of conductor 8, or can be integrated with the device specific plug 6, so that some or all of conductor 8 is disposed between the resistance circuit 10 and the line plug 12. In another alternative, conductor 8, resistance circuit 10 and plug 12 may be permanent parts of the source's structure, such as permanent wiring in a car, and plug 6 may be integrated into a base unit into which the telephone 2 is seated when not in use. Plug 6 will then be structured as part of that base such that seating the telephone in the base unit brings plug 6 and socket 4 into operative contact, so that battery charging of the telephone automatically occurs as needed as long as the telephone is seated in the base.

While such connectors and converters in their various embodiments are widely used, their structure is such that they are less than optimum for convenience and cost effectiveness for most customers and for manufacturers, distributors and retailers of such products. As is evident from the description above, each connector or converter is a unitary device, configured for a specific device and a specific source. Many people own two or more low voltage devices, such as two cellular phones, a phone and a laptop computer, etc. Differences in the structures of the sockets 4 of the various devices are common, since many device manufacturers incorporate their own proprietary socket structures into their products. Consequently, a person who owns a plurality of devices must usually also purchase and use an equivalent plurality of connector or converter products. This is of course costly, but is also inconvenient, since one often finds that he or she has picked up the wrong connector or converter product for the specific device, and that the correct product is elsewhere (e.g. at home instead of in the car, at the office instead of at home, etc.).

In addition, both OEM and after-market manufacturers must produce different connector or converter products for some or all of the electronic devices in their product lines, since the devices may be used with different sources, or the devices may have different socket structures. This is costly for the manufacturer, since additional assembly procedures and worker training, as well as complex inventory and shipping space, control and handling are needed. The likelihood of errors in storing, handling and shipping is also increased.

Further, distributors and retailers also are burdened, since each must order, stock, handle and inventory numerous different connector and converter products. Since a distributor's or retailer's shelf space is finite, and many different kinds of products must compete for that shelf space, the distributor or retailer must limit the number of different connector and convertor products stocked. This of course often leads to lost sales and customer dissatisfaction, when a customer cannot find on the distributor's or retailer's shelf the particular connector or converter product required to fit the customer's specific telephone or other device.

Finally, when a specific telephone or other electronic product is discontinued by its manufacturer, or its electrical configuration is changed in an upgrade or model change, the distributors and retailers usually demand that the OEM or after-market converter or connector product manufacturer take back all of such unsold products and refund the product cost. Such returns and refunds of course are costly for the manufacturer, and in addition the current products are structured such that the return products cannot recycled or reused, at least not in whole, and therefore most or all of each returned product must be discarded, again at substantial cost to the manufacturer.

Some attempts have been made to avoid such deficiencies, but they have been less than satisfactory. For instance, devices have been disclosed in which conductor 8 has been either actually or in effect been forked, i.e., divided into a 2- or more branched Y-shape, each branch terminating in a separate device plug 6 or having each branch terminate in a socket into which a conductor running from a device 2 is plugged. While this does permit more than one device 2 to be used with a single connector or conductor product, all devices must run on identical voltage (or else a plurality of resistance circuits 10 must be used) and the only one device 2 can be used at a time, to avoid current reduction to each device, thus always having present an unwieldy multiplicity of unused branches of the product. Such devices are difficult for manufacturers to produce, and have not been well received by the customers.

It would therefore be of value to manufacturers, distributers, retailers and customers if converter and connector products were available which did not have these technical and economic deficiencies.

SUMMARY OF THE INVENTION

I have now invented an article which provides for powering or charging the battery of a variety of different electronic devices, with the article being in two parts. The first part has components such that it is "universal" for use with all of the variety of different devices, and the second part has components which are specific to the operation of only a single model, type or brand of such device or of closely related devices which operate with the same voltage and plug-compatibility requirements of the specific device.

In particular, my article with both parts (modules) present will operate a specific model, type or brand of device. However one can disconnect the two parts from each other and connect a different second part for a different device to the same first part, thereby being able to operate two different devices with substitution of only one part (the second) rather than requiring substitution of the entire article when a difference device must be powered or its battery charged.

The article is particularly useful for powering or charging the batteries of devices such as cellular telephones, computers and the like from house, office or other building electrical systems or from vehicle electrical systems.

In one broad embodiment, therefore, the invention is an article for providing electrical operating power or battery charging power to an electronic device, which article comprises a first module comprising a first electrical circuit required for operating or charging a battery of the device and all other devices of like type, the module also comprising a first connector in the first circuit for electrical connection to a source of the power; and a second module comprising second electrical circuit connecting with and supplementing the first circuit, the second circuit comprising a connector and components specific to the device and being releasably connected to and cooperating with the first circuit to operate the device; the first and second modules being separable from each other such that the first module can be connected to a different second module for operation of a different one of such devices.

In another broad embodiment, the invention is a power/battery charger cable article for conveying low voltage power from a source of the low voltage power to an electronic device, which device includes a shaped receiver for electrical connection to the device and which operates at a specific voltage, the article comprising a first module comprising a first electrical connector for electrical attachment to the source of low voltage power; electrically connected thereto a first electrical circuit comprising only those universal circuit elements common to power or charging circuits for all devices in a plurality of different ones of the electronic device; a first part of a second electrical connector connected to the first electrical circuit; and a second module comprising a second part of the second electrical connector, the first and second parts releasably interconnecting to conduct electrical current therebetween; a second electrical circuit comprising those supplemental circuit elements which when electrically connected with the universal circuit elements of the first electrical circuit form a complete electrical circuit which provides electrical power to the device at the voltage required by such device; an electrical conductor electrically connecting the second part of the second electrical connector to the second electrical circuit; and a third electrical connector for electrically interconnecting the second circuit and the electronic device and shaped to interconnect with the shaped receiver of the device for transmission of the electrical power to internal electrical circuitry of the device; whereby the article can be made serially operable for any of the plurality of the devices through different second modules serially connected to the first module, the third connector of each of the different second modules being shaped to interconnect with less than all of the plurality of the devices, allowing interchange of the devices and their serial connection to the source by interchange solely of the respective second modules.

Other embodiments, components, uses and variations will be evident from the description below.

BRIEF DESCRIPTION OF THE DRAWINGS

FIG. 1 is a pictorial view of a one-part article of the prior art for providing low voltage power from a car's electrical system through the cigarette lighter socket to an electronic device, illustrated by a cellular telephone.

FIG. 2 is a pictorial view of an embodiment of a two-part article of the present invention, also for providing low voltage power from a car's electrical system through the cigarette lighter socket to an electronic device, illustrated by a cellular telephone.

FIG. 3 illustrates pictorially two embodiments of shapes of connectors which are required respectively by various embodiments of electronic devices within a plurality of such devices available in the marketplace, these shape embodiments being in addition to the shape of the connector shown in FIGS. 1 and 2.

FIG. 4 is a pictorial view of a portion of FIG. 2, illustrating the substitution of an AC 110-volt convertor for a DC connector, with the converter being attached to a house or office electrical wiring system be being plugged into a wall socket.

DETAILED DESCRIPTION AND PREFERRED EMBODIMENTS

Figure 4:
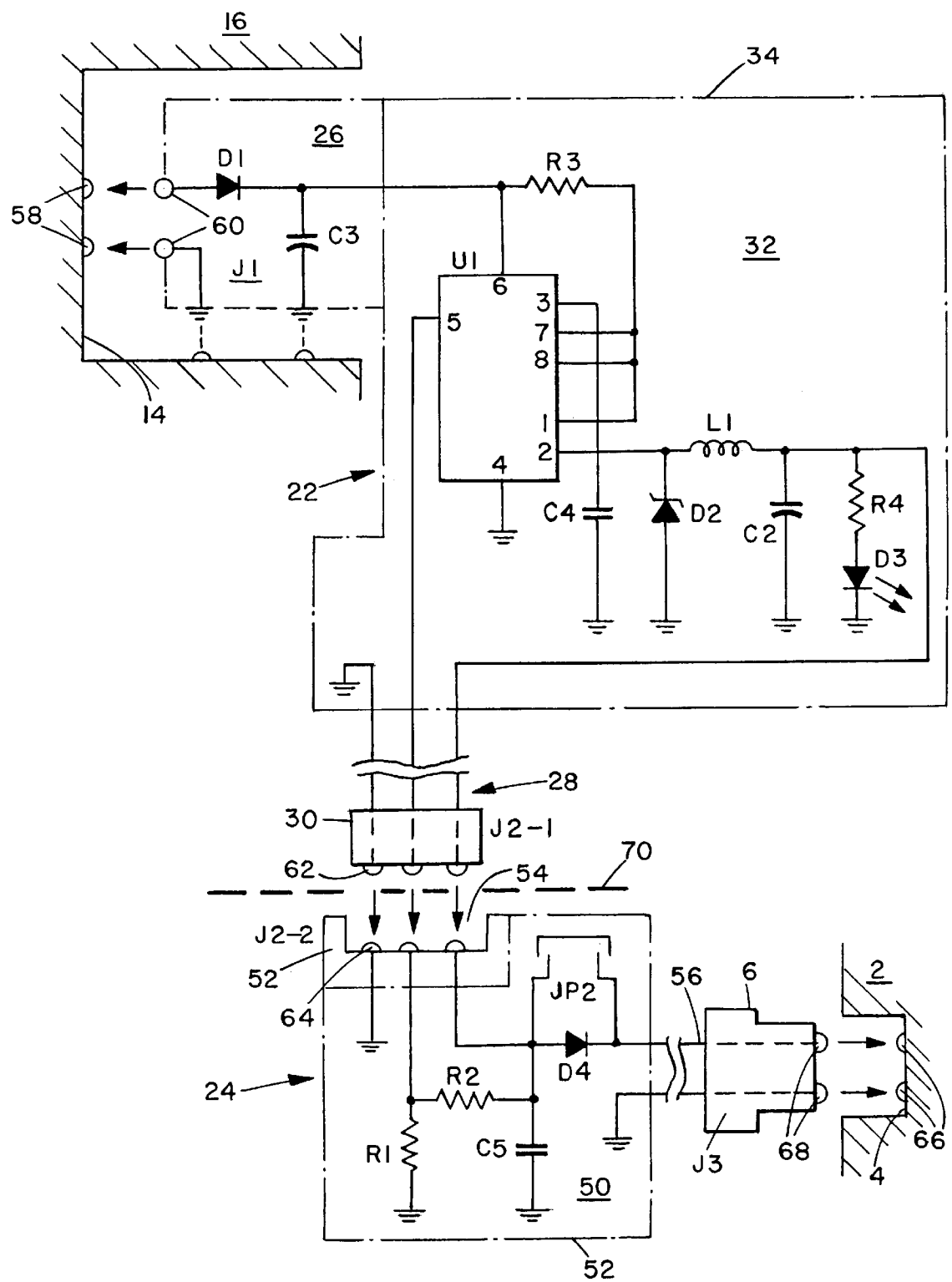
FIG. 4 is a circuit diagram illustrating in outline a typical embodiment of the article of the present invention and typical circuitry of such an article.

The invention herein is best understood by reference to FIGS. 2–5, from which the invention may be compared with the prior art systems exemplified by the illustration in FIG. 1.

Consider first FIG. 2, again using a cellular telephone as an representative example of an electronic, battery powered device 2, which is to be plugged into cigarette light socket 14 in automobile dashboard 16. The connector/conductor article of this invention is generally designated 20 and is configured with two interacting but separable modules, a "universal" module 22 and a "device" module 24. The universal module 22 has a physical structure and electrical circuitry which will connect to and operate with various standard power sources which are found in large numbers in the field. Most particularly, automobile cigarette lighter sockets, and in more recent vehicles, equivalent electrical take-off sockets (the cigarette lighter now often no longer being standard equipment on vehicles) are all of a single size and shape and almost all vehicles operate on a 12-volt DC electrical system. Consequently one universal module 22 has a line plug 26 which is shaped, wired and has contacts adapted to fit into and make electrical contact with corresponding contacts within socket 14 to allow the module 22 to draw electrical current and power from the vehicle's electrical system (not shown).

Line plug 26 is connected by a 2- or 3-wire conductor 28 to universal module connector (plug or socket) 30. Intermediate line plug 26 and module connector 30 is common circuit 32 (designated as inside housing 34). Common circuit 32 is not the equivalent of resistance circuit 10 of the prior art. Rather it contains only those electrical components of the article 20 which are required for all of the different devices 2 with which the several embodiments of the article 20 is intended to be used. It contains none of the electrical components which are specific to each specific type, model, or brand of such devices 2.

Alternatively, the common circuit 32 may be disposed inside housing 36 which is integrated with universal module connector 30. In another alternative, common circuit 32 may be divided between housings 34 and 36, but that is unduly complex and is not preferred.

A major alternative embodiment of module 22 is illustrated in FIG. 5. In this embodiment the article 20 is a converter and operates from a 110-volt source such as a house or office electrical system (not shown). In FIG. 5 the conversion circuit 38 is indicated as within housing 40 and connects with prongs 42 which plug into slots 44 in wall socket 46, which in turn is part of the house or office electrical system. The conversion circuit includes a transformer to step down the 110 V house or office current to the same standard output voltage that is output by common circuit 32 and also includes a converter to changes the alternating house or office current to direct current. The common voltage DC is then output through conductor 28 to module plug 30 as described above. Alternatively some or all of the conversion circuit 38 can be housed in housing 36, but neither is preferred, since putting all of circuit 38 in housing 36 requires transmission of 110 V power through line 28, and putting some of it in housing 36 makes the system unduly complex.

Module 22 is thus a product which can be manufactured, inventoried, stocked and sold in quantity. It is not dependent upon specific models, brands or types of electronic devices 2, and therefore is not subject to obsolescence, recall, or return when a particular device 2 no longer is an active market product, either generally or in particular local areas. Consequently, customers can purchase a single module 22, and be assured that it will operate effectively with a number of different devices 2 which they may own.

Module 22 cannot operate alone, however, and requires one or more embodiments of module 24 to make the system workable for any device 2. It will be helpful to clarify the relationship between modules 22 and 24. To be workable, the complete battery charger/power cable article 20 of this invention must of course include all of the components (such as resistors, capacitors, diodes, etc.) required for an operating charging/power circuit. Most of those components will be required in the circuit no matter what class (i.e., grouping of equivalent models, types or brands) of telephone, radio or other device 2 the cable article 20 is to be used with. These "universal" components are the ones which are present in module 22. In addition to those universal components, however, there will be one additional component, or a small combination (perhaps 2–5) of additional components, which make up circuit 50 which is specific to the individual class of devices 2 which a particular article 20 is to be used with. It is these components, incorporated into circuit 50, which are housed in module 24.

Frequently the uniqueness of the class of devices 2 of interest is due to a manufacturer's use of proprietary circuitry in its devices 2, including (but not limited to) a unique socket 4 shape which dictates a corresponding unique plug 6 shape, and a unique operating voltage, which dictates that module 24 contain one or more "device-specific" components [e.g., resistor(s) or capacitor(s)] needed to reduce the voltage output of the universal portion of the charging/power circuit (i.e., that portion in module 22) to the device's voltage. By keeping all of the universal components in module 22 and all of the device-specific components in module 24, the costs of manufacture of the various modules 24 and associated plugs 6 are kept to a minimum, thus optimizing the economics of the invention for both manufacturer and end user.

There are thus two elements of this invention which together comprise the "device-specific" portion of the overall article 29—the plug 6 and device-specific circuit 50, which is inside housing 52. Plug 6 is connected by 2- or 3-wire conductor 56 to circuit 50. It will be noted that neither the plug 6 alone nor the component(s) in circuit 50 are necessarily limited solely to use with only one class of devices 20. Both the plug 6 and the component(s) of circuit 50 may also appear in other articles of this invention, but an overall combination of one particular shape of plug 6 and one particular mix of components of circuit 50 will only appear in one model of article 20 intended for only one class of devices 2. An individual such class may include many models, types and brands of devices 2, or a class may consist of only a single model, type or brand of device 2, or anything in between. In any event, this invention contemplates that each such class of devices 2 which have its own unique article 20, which will be marketed as exclusively for that class of devices 20.

Housing 52 also includes device module connector 54, which mates with universal module connector 30 to form an operable electrical connection between modules 22 and 24. In FIG. 2 universal module connector 30 is shown as a male plug which is received within a female socket configuration of device module connector 54. It will be understood of course that these two configurations can be reversed, with connector 54 being the male plug and connector 30 being the female socket.

Plug 6 is, as discussed above, shaped to mate with socket 4 on device 2, regardless of the proprietary or unique shape of socket 4. As will be understood, there can be many different configurations of plug 6; the present invention is not limited to one or a few plug configurations, but is compatible with any plug 6 configuration. (For that reason the plugs illustrated in FIGS. 2, 3 and 6 will be understood to be only examples and not indicative of any limitation.) The uniqueness or proprietary aspect of socket 4 may reside in its well depth; well wall shape; cross-sectional shape; presence or absence of keyways or guide ribs; location, number and/or shape of electrical contacts within the well, or in combinations of these or other structures. In any event, plug 6 will be configured to conform to those structures; for instance, a configuration of plug 6 different from that illustrated in FIG. 2, conforming to a different configuration of socket 4, is illustrated in FIG. 3 and designated 6'. Plug 6 may also include non-electrical elements which allow it to releaseably lock into socket 4. The locking elements (not shown) may cooperate with a corresponding structure within socket 4, on an adjacent surface of device 2, or a combination of both. (The male/female structures of plug 6 and socket 4 can be reversed, and such reverse mode is intended to be covered by this invention. Such a reverse configuration is exemplified in FIG. 3 by the socket designated 6", which would mate with a plug-form configuration of socket 4 (not shown). However, as a practical matter the large majority of devices 2 are manufactured with a socket 4 instead of a "plug 4," to avoid the presence of unnecessary protrusions on device 2, which could be damaged or destroyed during handling of device 2 by a user, so the plug 6/socket 4 configuration is preferred in this invention.)

For embodiments such as those illustrated in FIGS. 2–5, it will be convenient to make conductor 56 in one or a very few fairly short lengths (perhaps one or two in the range of 6"–12" [15–30 cm]), also to minimize the cost of module 24 and to simplify storage for the customer. In addition, the smaller the size of each module 24, the more different embodiments of module 24 a retailer can stock and display. The preference is then to have universal module 22 manufactured with conductor 28 being offered in a limited variety of different lengths, normally all somewhat longer than the length of conductor 56. The customer would then determine the overall length of article 20 which is needed for him or her to use the specific device 2 easily and conveniently in a car, office, home, or other location, and then purchase an universal module 22 of the length which, when combined with the short device module 24, will provide that overall length. Commercial module 22 lengths might include, for instance, a series of lengths at 6" (15 cm) intervals over a range of 2'–5' (60–150 cm) total length, to produce overall article 20 lengths ranging between 2½' and 6' (75–180 cm). Of course lengths of either or both modules 22 and 24 and of the complete article 20 may also be longer or shorter as desired.

Figure 6:
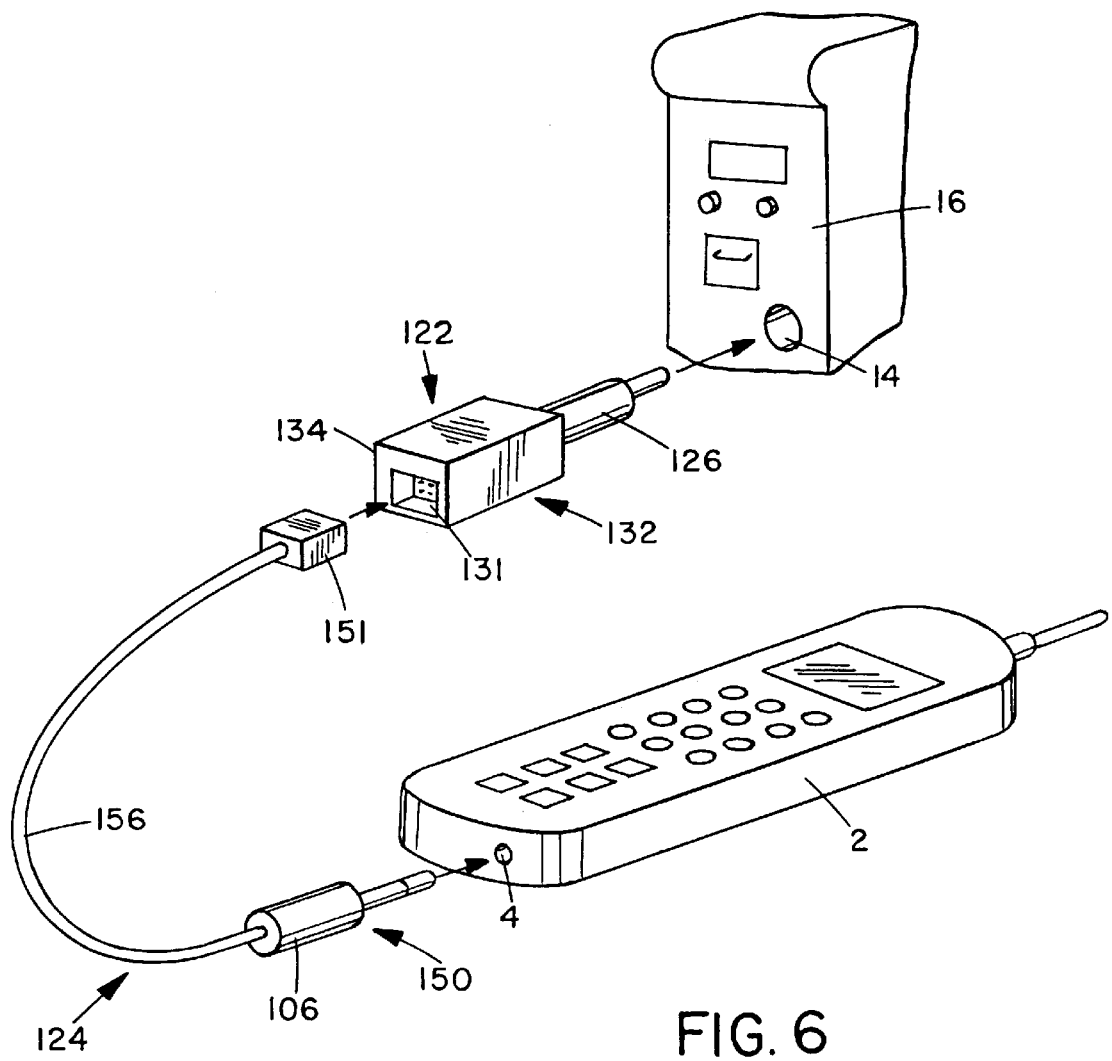
FIG. 6 is a pictorial view of another embodiment of a two-part article of the present invention, also for providing low voltage power from a car's electrical system through the cigarette lighter socket to an electronic device, illustrated by a cellular telephone.

A different embodiment of the battery charger/power cable article of the present invention is illustrated in FIG. 6. In this embodiment all of the universal components and the connector for the vehicle socket are combined in a single housing unit which includes a JP11 socket 131. There is no external conductor 8, so the universal module, here designated 122, therefore has no external wires or cables itself; the connection between the contacts of connector 126 and universal circuit 132 is internal to housing 134. The socket 131 is conventional and receives a corresponding conventional JP11 plug 151, to which is connected one end of connector 156, which may be considered the analog to connector 56 of the FIG. 2 embodiment. Connector 156 at its other end is connected to plug/housing 106, the interior of which contains the device-specific circuit 150, the equivalent of circuit 50 of the FIG. 2 embodiment. Plug/housing 106 in turn plugs into socket 4 in device 2 in the manner described above. This is a particularly economical embodiment of the present article invention to manufacture, since the module 122 and its connector 126 are integrated into a single combination housing 134 and the module 124 concentrates the device-specific component(s) of circuit 150 into a unitary housing combination with plug 106. so that effectively the housing 52 and plug 6 of the FIG. 2 embodiment are integrated into a single unit in the FIG. 6 embodiment. Thus the remainder of module 124 comprises conductor 156 and JP11 plug 151, both of which are conventional products.

Other embodiments will be evident to those skilled in the art from these examples.

The significant and beneficial practical and economic effects of this invention and its unique two-part (two-module) structure are evident. A customer who owns a single universal module 22 product does not need to buy additional module 22 products each time he or she obtains or wants to use a different device 2—all that is needed is to obtain the appropriate device-specific module 24 product. Thus the customer saves money and does not have to keep track of a variety of mutually incompatible long connector or converter products. To a single universal module 22, the customer can add one or more short device specific modules 24, which when not in use can easily be stored in, for instance, a glove compartment of a car.

The manufacturer, distributor and retailer also benefit. The manufacturing operations are simplified, since most of the article 20—the universal module 24—is manufactured in a single universal electrical and physical configuration, with only the chosen lengths of the conductor 28 being changed. The manufacture of the device specific modules 24 is also simplified, since each module 24 is small and contains a minimal amount of circuitry. Additionally for the manufacturer, when a particular device 2 is withdrawn from the market only the unsold modules 24 for that specific device will be returned, so that the associated universal modules 22 are not affected and are not wasted by having to be returned and discarded as did the prior art unitary devices.

The distributor and retailer benefit by being able to stock and display a much wider assortment of articles 20. Since the modules 24 do not take up as much display space as do the modules 22, and of course much less overall than did the unitary prior art products, a limited portion of the display space can be assigned to an appropriate quantity of the different lengths of modules 22, and the remained used to display a wider variety of the smaller modules 24. This greatly improves the chances that the specific type of module 24 needed by a customer will be available, leading to greater sales and more customer satisfaction.

An example of a circuit diagram for a typical article 20 of this invention as illustrated in FIG. 2 is shown in FIG. 4, which illustrates using a 12 V car electrical system to power or charge batteries of a cellular telephone. Each of the elements of the article is indicated in FIG. 2, some by dotted outlines. Within the cigarette lighter socket 14 contacts 58 to the vehicle's electrical system are shown as mating with corresponding contacts 60 of plug 26, as are similar contact pair 62 of plug 30 and 64 of socket 54 and contact pair 68 of plug 6 and 66 of socket 4. Plug 26 is integrated with module housing 34. Within the circuit of the example disclosed in FIG. 4 the various electrical components are designed have the following values or identifications:

| | |
|---|---|
| C2 | 220 μF @ 16 V |
| C3 | 100 μF @ 3.5 V |
| C4 | 470 μF |
| C5 | 0.1 μF |
| D1 | IN4004 |
| D2 | IN5819 |
| D3 | Red LED |
| D4 | IN4004 |
| J1 | 12–30 V DC IFP (2-wire) [Input] |
| J2 (1, 2) | Phone jack (3-wire) |
| J3 | Plug 6 [Output at desired voltage] |
| JP2 | Jumper |
| R1 | 24 KΩ (1%) |
| R2 | 12.7 KΩ (1%) |
| R3 | 0.22 KΩ |
| R4 | 1.2 KΩ |
| U1 | MC34063A |

The components which are in plug 26 or universal circuit 32 are common to all of the devices 2 which the article 20 is intended to work with. It is those components (which in this example are C5, D4, R1 and R2) which are within module 24 and are specific to the example telephone device 2 of interest. Thus, considering FIG. 4, the module 22 (shown separated from module 24 by indicator line 70) would be sold as a single unit for use with a variety of devices 2, while the user would have to purchase, in addition to a single module 22, as many different modules 24 as were needed for the various devices 2 which he or she desires to operate.

The article 20 thus presents a unique two-part structure which disposes "universal" and "device specific" electrical or electronic components into the separate parts of the article, providing versatility for the use, lower cost, improved manufacturing, and greater availability of different embodiments in the marketplace.

It will be evident that there are numerous embodiments not expressly set out above which are clearly within the scope and spirit of the invention. The description above is therefore intended to be exemplary only, and the actual scope of the invention is to be determined from the appended claims.

I claim:

1. An article for providing electrical operating power or battery charging power to an electronic device, which article comprises:

a first module comprising a first electrical circuit required for operating or charging a battery of said device and all other devices of like type, said module also comprising a first connector in said first circuit for electrical connection to a source of said power; and a second module comprising second electrical circuit connecting with and supplementing said first circuit, said second circuit comprising a connector and components specific to said device and being releaseably connected to and cooperating with said first circuit to operate said device;

said first and second modules being separable from each other such that said first module can be connected to a different second module for operation of a different one of such devices.

2. An article as in claim 1 wherein said second circuit comprises components to convert voltage output of said first circuit to a lower voltage on which said device operates.

3. An article as in claim 1 wherein said first circuit comprises components to convert alternating current at said source to direct current.

4. An article as in claim 1 wherein said direct current is at a lower voltage than said alternating current.

5. An article as in claim 1 wherein said source comprises a building electrical system or a vehicle electrical system.

6. A power/battery charger cable article for conveying low voltage power from a source of said low voltage power to an electronic device, which device includes a shaped receiver for electrical connection to said device and which operates at a specific voltage, said article comprising:

a first module comprising:

a first electrical connector for electrical attachment to said source of low voltage power;

electrically connected thereto a first electrical circuit comprising only those universal circuit elements common to power or charging circuits for all devices in a plurality of different ones of said electronic device;

a first part of a second electrical connector connected to said first electrical circuit; and a second module comprising:

a second part of said second electrical connector, said first and second parts releaseably interconnecting to conduct electrical current therebetween;

a second electrical circuit comprising those supplemental circuit elements which when electrically connected with said universal circuit elements of said first electrical circuit form a complete electrical circuit which provides electrical power to said device at said voltage required by such device;

an electrical conductor electrically connecting said second part of said second electrical connector to said second electrical circuit; and a third electrical connector for electrically interconnecting said second circuit and said electronic device and shaped to interconnect with said shaped receiver of said device for transmission of said electrical power to internal electrical circuitry of said device;

whereby said article can be made serially operable for any of said plurality of said devices through different second modules serially connected to said first module, said third connector of each of said different second modules being shaped to interconnect with less than all of said plurality of said devices, allowing interchange of said devices and their serial connection to said source by interchange solely of said respective second modules.

7. An article as in claim 6 wherein said first electrical connector and said first electrical circuit are enclosed in a first housing and said third electrical connector and said second electrical circuit are enclosed in a second housing.

8. An article as in claim 6 wherein source voltage at said source is greater than said voltage on which said device operates, and said supplemental circuit elements comprise resistors of values appropriate to reduce at least in part said source voltage to said voltage at which said device operates.

9. An article as in claim 8 further wherein said universal circuit elements in said first circuit reduce said source voltage to an intermediate voltage equal to the highest voltage on which any of said plurality of said devices operates, and said supplemental circuit elements reduce said intermediate voltage to said voltage at which a specific device operates.

10. An article as in claim 6 wherein said first electrical connector comprises a male plug configured to fit into and electrically interconnect with a female socket installed in a vehicle, such that such plug/socket interconnection electrically connects said article to an electrical system of said vehicle, whereby said vehicle electrical system comprises said source providing electrical energy to said electronic device through said article.

11. A kit comprising an article as in claim 6 having one first module and associated therewith a plurality of said second modules, each second module having a third connector different from a third connector of any of other second modules in said plurality.

* * * * *